United States Patent [19]

Weichenrieder, Sr.

[11] Patent Number: 4,583,748
[45] Date of Patent: Apr. 22, 1986

[54] FACE SEAL FOR SHAFTS OF MACHINES PROCESSING SYNTHETIC RESIN

[75] Inventor: Erich Weichenrieder, Sr., Egling-Neukolbing, Fed. Rep. of Germany

[73] Assignee: Recycloplast AG, Egling-Neukolbing, Fed. Rep. of Germany

[21] Appl. No.: 634,083

[22] Filed: Jul. 24, 1984

[30] Foreign Application Priority Data

Jul. 27, 1983 [DE] Fed. Rep. of Germany ....... 3327131

[51] Int. Cl.⁴ ............................................... F16J 15/34
[52] U.S. Cl. ................................ 277/81 R; 277/93 R; 277/96.2
[58] Field of Search .................. 277/81 R, 82, 83, 91, 277/93 R, 93 SD, 96, 96.1, 96.2

[56] References Cited

U.S. PATENT DOCUMENTS

| | | | |
|---|---|---|---|
| 2,555,932 | 6/1951 | Reed | 277/81 R |
| 2,698,195 | 12/1954 | Pollard | 277/81 R |
| 2,980,452 | 4/1961 | Cahill et al. | 277/96.2 X |
| 3,069,176 | 12/1962 | Woodcock et al. | 277/93 R X |
| 3,101,200 | 8/1963 | Tracy | 277/81 R X |
| 3,188,095 | 6/1965 | Van Vleet | 277/83 X |
| 3,199,795 | 8/1965 | Bennett et al. | 277/96.2 X |
| 3,218,110 | 11/1965 | Conner | 277/91 R X |
| 3,601,413 | 8/1971 | Darnell | 277/96.2 |
| 3,961,799 | 6/1976 | Peet | 277/81 R X |
| 3,972,536 | 8/1976 | Warner et al. | 277/83 |
| 4,097,052 | 6/1978 | Heinen | 277/96.2 |
| 4,114,900 | 9/1978 | Wiese | 277/93 SD X |
| 4,145,059 | 3/1979 | Imai et al. | 277/81 R |

FOREIGN PATENT DOCUMENTS

| | | | |
|---|---|---|---|
| 157834 | 7/1954 | Australia | 277/96 |
| 908692 | 4/1954 | Fed. Rep. of Germany | 277/96.1 |
| 2700846 | 7/1978 | Fed. Rep. of Germany | |
| 54-108164 | 8/1979 | Japan | 277/96.2 |
| 230318 | 3/1944 | Switzerland | 277/96 |
| 189479 | 12/1922 | United Kingdom | 277/81 R |
| 653957 | 5/1951 | United Kingdom | 277/81 |
| 933389 | 8/1963 | United Kingdom | 277/81 R |
| 1447569 | 8/1976 | United Kingdom | 277/93 R |
| 2056584 | 3/1981 | United Kingdom | 277/83 |

*Primary Examiner*—Robert S. Ward
*Attorney, Agent, or Firm*—Harness, Dickey & Pierce

[57] ABSTRACT

A shaft seal for machines processing synthetic resin under pressure and in a plastified condition has two sealing rings that contact each other along a sealing interface running out from the shaft axis. The sealing ring that is further from the housing containing the resin has means spring loading it towards the other sealing ring.

1 Claim, 1 Drawing Figure

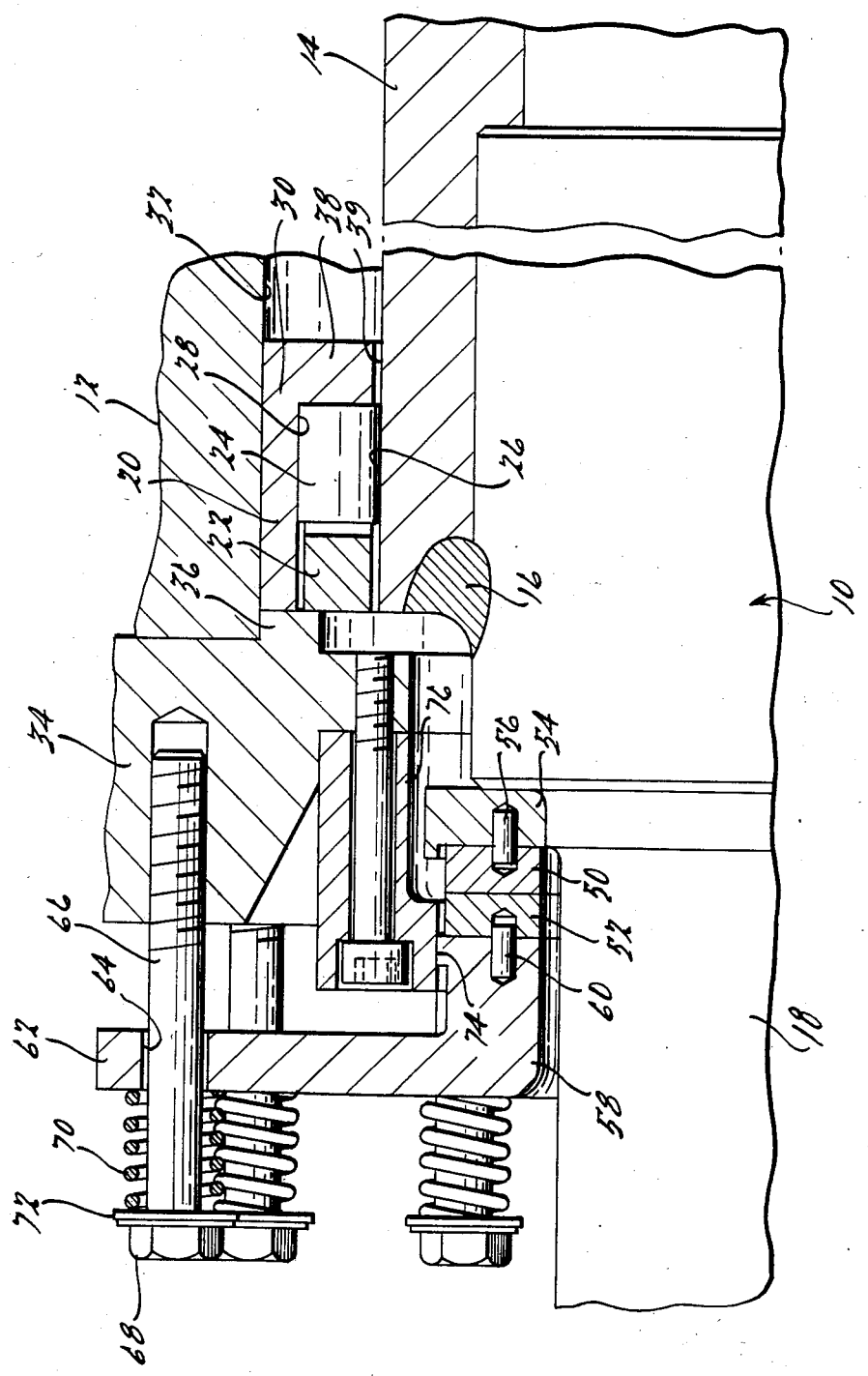

FACE SEAL FOR SHAFTS OF MACHINES PROCESSING SYNTHETIC RESIN

BACKGROUND OF THE INVENTION

The present invention relates to a seal for a shaft running through the wall of the housing of a working chamber filled with plasticized resin under pressure as part of a resin processing machine.

More specifically the invention is concerned with mechanical seals for squeeze roll presses for recycling scrap synthetic resin by producing a regenerate therefrom. Such a squeeze roll press is described in the German Pat. No. 2,700,846. The invention will be explained with reference to such a squeeze roll press, although at the same time being generally well suited for use in connection with other resin processing machines operating at high pressures and temperatures.

A number of different requirements have to be met by a shaft seal of this sort. It has to be able to hold back the resin under a high pressure in the working chamber, because this pressure is necessary not only for the plasticization but also for the expulsion of the plasticized resin from the working chamber without any other means, as for example a conveying worm or screw. Because during operation of the machine one-sided loading may cause the shaft to wobble or run eccentrically, the seal has to be such that it makes allowance in this respect and still gives a full sealing function. When the machine is started up and there is a sharp rise in temperature, the seal has to be in a position of allowing for expansion, more specially of the shaft, without becoming functionally unreliable. Lastly, the seal should be able to be dismounted without it being necessary for the resin processing machine to have to be dismantled as well so that in fact the replacement of defective parts is relatively simple.

SHORT OVERVIEW OF THE INVENTION

One purpose of the invention is to design a seal which meets these needs. To do this a shaft seal of the sort noted is designed with a sealing ring placed around the shaft and which is supported radially by the housing and loaded, more specially by spring means, axially towards the working chamber, and resting axially against a further sealing ring supported on the shaft, the said rings being made of a heat- and wear-resistant material.

The faces of the sealing rings that are pressed against each other make certain of a sealing effect. Because the spring loading effect is towards the space inside the processing chamber, the shaft may expand against the loading effect, and when there is an increase in temperature and with it further expansion, the force loading the seal will go up at the same time. Because the load on the seal is from the outside to the inside, the elements used to produce the spring loading effect may be mounted on the outside of the machine where they may be readily dismounted. Furthermore by supporting the sealing ring with a resilient elastic effect, eccentric or wobbling motion, and for this reason an adaptation to the motion of the shaft may be allowed for.

Preferably the spring-loaded sealing ring is carried by a ring-like backup body.

In keeping with a more specially expedient form of the invention the ring-like backup body has a radially running flange with axial pins, that are fixed to the housing, running through it, each such pin having thereon a stop spaced axially from the side of the flange facing away from the housing for a compression spring on the pin in question and whose other end acts against the flange.

As part of another useful further development of the invention the ring-like backup body is guided axially by a centering ring that surrounds the body for a small part of its axial length, and is positioned on the housing.

Further useful developments of the invention will be seen from the claims when read in conjunction with the specification.

A more detailed account of the invention will now be given using the drawing of a working example of it.

DETAILED ACCOUNT OF WORKING EXAMPLE OF THE INVENTION

The single FIGURE of the drawing is an axial section through the bearing and seal part of the drive end of the shaft running through the housing of a squeeze roll press for the processing of plastic or synthetic resin.

The shaft 10 of a squeeze roll press is supported by bearings in a housing 12. The shaft 10 is made up of a hollow body of revolution 14, that is joined by a weldment 16 with a shaft trunnion 18. The trunnion 18 protrudes out of the machine to be joined to a drive for example.

The bearing is in the form of an anti-friction bearing 20, that comprises cylindrical rollers 24 spaced by a cage 22. The inner running or race face 26 of the bearing is on the body of revolution 14, and the outer running face 28 is on an outer race ring 30, that is seated in a hole 32 in the housing 12. The hole 32 is shut off from the outside by an end plate 34, that has a ring-like collar 36 fitting into the hole 32 to keep the race ring 30 and the cage 22 in place.

Because the squeeze roll press is more specially to be used for the processing of scrap synthetic resin or plastic, whose plasticization is undertaken by the use of high pressures and temperatures, and because such resin scrap may well contain foreign bodies such as nails, the bearing race ring 30 is designed with a radially inwardly running guard lip or flange 38, that at the operating temperature of the machine will only have a small gap 39 between it and the inner race or running face 26 so that such foreign bodies will be kept out of the bearing. At the same time a throttling effect is produced somewhat reducing the pressure of the plasticized resin finding its way into the bearing and which is used for lubrication thereof.

The pressure of the resin, that is still relatively high, takes effect further to the left from the bearing 20. However it is still necessary to check escape of the resin and concomitant drop in pressure in the working chamber of the machine, because the high pressure is a requisite condition for the plasticization of the resin and for expelling it when plasticized from the machine.

For sealing purposes use is made of two metallic carbide rings 50 and 52 with radial sealing faces. The sealing ring 50 is supported on a backup ring or body 54 with which it is joined by driver pins 56 that are equally spaced circumferentially. The other sealing ring 52 is supported on a pressure ring 58 and joined with it by driver pins 60 that are spaced out circumferentially. The pressure ring 58 has a flange 62 running radially outwards from it that is at an axial distance from the end plate 34. This flange 62 has through holes 64 that are evenly spaced out circumferentially and have screws 66 running through them. The screws are fixed in the end plate 34, which in turn is screwed to the housing 12. On the side of the flange 62 facing away from the end plate 34 the screws 66 have heads 68 that are spaced from the flange 62. On the part of each screw 66 next to the head 68 there is a helical compression spring 70, whose one end rests against a washer 72 between it and the head 68 and whose other end rests against the flange 62 so that the last named and with it the pressure ring 58 are spring-loaded towards the housing 12 and for this reason towards the processing chamber within the housing. The force of the springs causes the metal sealing ring 52 to be pressed against the sealing ring 50, while on the other hand still allowing for expansion of the shaft 10 due to the rise in temperature when the machine is heating up, because the springs 70 are able to give way without the sealing engagement of the sealing rings being jeopardized.

The pressure ring 58 and the sealing ring 52 thereon keep at a certain readial clearance from the shaft 10. Next to the sealing ring 52 the pressure ring 58 is fashioned with a collar 74 running outwards radially to contact a centering ring 76 screwed to the end plate 34. This design with radial clearances makes it possible for the pressure ring 58 to be displaced to allow for eccentric or wobbling motion of the shaft 10 so that in this case as well one may still be certain of a complete sealing action.

The design described offers not only overload protection and a dependable sealing action but furthermore the useful effect that it may readily be dismounted without dismantling the housing 12 so that it is readily serviced and all or only some parts of it may be easily replaced.

I claim:

1. A shaft seal for a shaft running through the wall of a housing of a chamber for the processing of plasticized resin under pressure within a resin processing machine, said shaft having an enlarged first portion housed in said chamber and a second portion extending from said chamber, said second portion positioned outside of said chamber, comprising a first heat and wear resistant sealing ring, said first sealing ring having a running face placed around said second portion of said shaft and extending outward therefrom, a second heat and wear resistant sealing ring, said second sealing ring mounted on said shaft around said second portion of said shaft, said second sealing ring positioned between said first sealing ring and said first portion of said shaft, said second sealing ring having a running face which is acted upon by the running face of said first ring, a centering ring supported on said housing and secured to said second sealing ring for radially supporting said second sealing ring, a ring-like backup body having a radially extending flange secured to said first sealing ring for radially suporting said first sealing ring, a plurality of pins circumferentially spaced around said radial flange, each pin having a stop and a spring element, said spring elements being coaxially positioned around said pins, said pins being passed through said flange and fixed to said housing such that said stops are spaced a predetermined distance from said flange and said spring elements are biased between said stops and said flange, said spring elements loading said sealing rings and urging said sealing rings towards said chamber and along said shaft, and a radial clearance between said rings and said second portion of said shaft for enabling said shaft to expand in response to increases in temperature in said resin processing machine.

* * * * *